United States Patent [19]

Pohjola

[11] 3,973,638
[45] Aug. 10, 1976

[54] STRUCTURE FOR LATERALLY BRACING AN ENDLESS TRACK OF A VEHICLE

[76] Inventor: Jorma Toivo Tapani Pohjola, Haravatie 6, 90530 Oulu 53, Finland

[22] Filed: Jan. 21, 1975

[21] Appl. No.: 542,844

[52] U.S. Cl. ............................... 180/9.46; 305/17
[51] Int. Cl.² .......................................... B62D 55/10
[58] Field of Search ............ 180/9.44, 9.46; 305/16, 305/17, 18, 44, 47, 48

[56] References Cited
UNITED STATES PATENTS

| | | | |
|---|---|---|---|
| 1,756,770 | 4/1930 | Venzlaff | 180/9.44 |
| 2,356,528 | 8/1944 | Mette | 180/9.44 |
| 2,363,015 | 11/1944 | Norelius | 305/54 |
| 3,367,726 | 2/1968 | Tucker | 305/18 |
| 3,565,198 | 2/1971 | Ames | 180/9.44 |

Primary Examiner—M. H. Wood, Jr.
Assistant Examiner—John A. Carroll
Attorney, Agent, or Firm—Steinberg and Blake

[57] ABSTRACT

A structure for laterally bracing an endless track of a vehicle. The endless track has opposed sides one of which becomes shorter and the other of which becomes longer when the vehicle executes a turn, and the endless track has a longitudinal central portion situated between these opposed sides. A suitable guiding structure is carried in part by the body of the vehicle and in part by the endless track for guiding and laterally bracing the latter, with this guiding structure being situated only along the longitudinal central portion of the endless track so that the guiding of the endless track is applied at the longitudinal central portion thereof in order to laterally brace the endless track when the vehicle executes a turn.

8 Claims, 6 Drawing Figures

STRUCTURE FOR LATERALLY BRACING AN ENDLESS TRACK OF A VEHICLE

BACKGROUND OF THE INVENTION

The present invention relates to endless track vehicles such as vehicles which are provided with a swivelling caterpillar track capable of curving at the region of at least one end of the vehicle when the latter executes a turn.

As is well known, such an endless track becomes longer on one side and shorter on the other side when the vehicle executes a turn by turning one or both of the end rolls of the vehicle around which the track moves, and the present invention relates in particular to a method and structure for laterally bracing the endless track when the vehicle executes a turn.

Vehicles having endless tracks capable of contracting on one side while elongating on an opposite side during execution of turns have already been proposed, these vehicles having a swivelling caterpillar track as referred to above.

During the execution of turns with such vehicles it also has already been proposed to provide for lateral bracing of the endless track, and it has already been proposed to provide such lateral bracing at a transverse center line of the vehicle situated between the opposed front and rear ends thereof. Thus, such lateral bracing which has already been proposed includes a pair of fixed horizontal rolls which engage the opposed side margins of the endless track in order to support the latter when the vehicle executes a turn. This type of known lateral bracing, however, has a drawback in that, particularly with heavy loads, the endless track cannot be maintained successfully in a curved configuration. Instead the endless track tends to buckle locally and the direction of the endless track changes abruptly at the bracing rolls.

In order to eliminate this latter drawback it has already been proposed to make at least part of the lateral bracing structure laterally shiftable according to the turning radius of the vehicle so that in this way it will be possible to situate the lateral bracing structure substantially along an arc which is consistent with the turning radius of the vehicle and the endless track thereof. Also, it has been proposed to provide at the side margins of the endless track or at the vicinity thereof a lateral bracing structure which engages the endless track and which is either fixed or displaceable in such a way that when a turn is executed the supporting surface of the endless track shifts so as to always become located at the outer side of the turn. Through such an arrangement an attempt is made to improve the stability of the vehicle when executing turns.

However, with both of the above types of constructions the lateral bracing structure has been situated at the opposed sides of the endless track, in pairs, adjacent to the margins of the track. Such arrangements provide a drawback in that at the regions of this lateral bracing structure undesired detrimental deformations are produced in the endless track. In a track which is made up of a number of components undesirable stresses are created by impact between the lateral bracing structure and the track components.

SUMMARY OF THE INVENTION

It is accordingly a primary object of the present invention to provide a structure which will avoid the above drawbacks.

Thus, it is an object of the present invention to provide a structure which will be capable of reliably bracing an endless track laterally when a vehicle executes turns without, however, creating any undesired stressing or buckling in the track while at the same time maintaining the stability of the vehicle during execution of turns.

It is furthermore an object of the present invention to provide a structure according to which it becomes possible to simplify to a very large extent the previously known structures provided for the purpose of laterally bracing an endless track when a vehicle executes turns.

According to the invention, the lateral bracing of the endless track is carried out by guiding the track along a longitudinal central portion thereof which is situated between the opposed sides of the track so that by providing such guiding only at the longitudinal central portion of the endless track means all of the difficulties encountered by the previously known arrangements cooperating with the opposed sides of the track are avoided and at the same time a considerable simplification and added stability are achieved.

Furthermore, it is an object of the present invention to provide a structure which is exceedingly rugged and reliable while at the same time being capable of effectively guiding an endless track means at a longitudinal central portion thereof in such a way as to achieve the desired lateral bracing without the drawbacks of the previously known constructions.

With the structure of the invention the vehicle includes a vehicle body, front and rear rolls respectively situated in the regions of front and rear ends of the vehicle body, endless track means extending around the front and rear rolls, a pair of frame means connected with the body and the rolls to support the body thereon, at least one of these frame means being connected to the body for turning movement around a substantially upright axis, this one frame means also being connected with one of the rolls for turning with the latter while this one frame means turns around the upright axis when the vehicle executes a turn. The endless track means has opposed sides one of which becomes longer and the other of which becomes shorter when the vehicle executes a turn, and the endless track means has a longitudinal central portion situated between the opposed sides thereof. A guide means is carried in part by the body of the vehicle and in part by the longitudinal central portion of the track means for guiding and laterally bracing the endless track means during execution of a turn.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
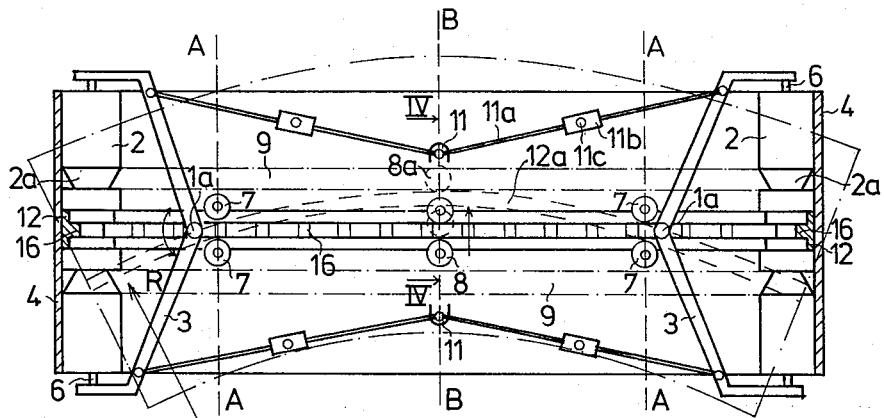
FIG. 1 is a schematic partly sectional top plan view of a vehicle provided with a swivelling endless track means utilizing the lateral bracing method and structure of the invention.

Referring now to the drawings, the vehicle illustrated schematically therein includes a body 1 which is fragmentarily illustrated in FIGS. 3–6. A pair of frame means 3 are connected with the vehicle body 1 for turning movement with respect thereto about substantially upright axes, respectively. For this purpose the pair of frames 3 are respectively connected with the body 1 by way of upright pivots 1a, these pivots having vertical axes. Each of the frame means 3 includes an elongated rod 6 which extends through and turnably supports a roll 2. Thus as is apparent from FIG. 1 the vehicle includes front and rear end rolls 2 respectively connected with the pair of frame means 3 which in turn are pivotally connected with the body 1 for turning movement with respect thereto about substantially upright axes, with the pair of frame means 3 serving to support the body of the vehicle on the pair of end rolls 2. An endless track means 4 extends around the front and rear rolls 2 so that the endless track means 4 moves around these rolls 2 when the vehicle travels. Steering of the vehicle is brought about by turning one or both of the frame means 3 about its vertical turning axis formed by the pivot 1a connected thereto. As a result of turning of the vehicle in this way, it will be seen that the rolls 2 approach each other at one of their ends and move further apart from each other at the other of their ends so that on one side of the vehicle the rolls 2 approach each other and on the other side of the vehicle the rolls 2 move further apart from each other. Of course, the endless track means 4 continues to move around the rolls 2 when the vehicle executes a turn so that the endless track means 4 becomes shorter on one side and longer on the other side when the vehicle executes a turn, as illustrated by the dot-dash line curved configuration of the track means 4 in FIG. 1. Endless track means having constructions suitable for such curving have already been proposed. In the illustrated example the endless track means 4 includes a central band 12 fixed to the inner surface of the endless track means 4 and being substantially non-stretchable.

Figure 2:
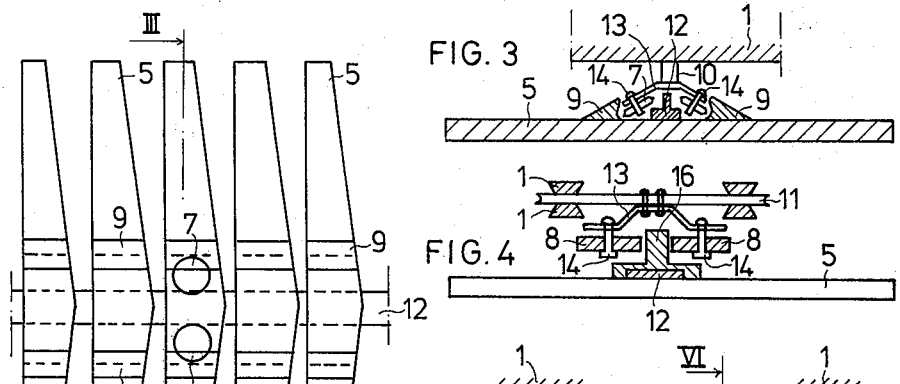
FIG. 2 is a fragmentary plan view of components of an endless track means provided with the lateral bracing means of the invention.
Figure 3:
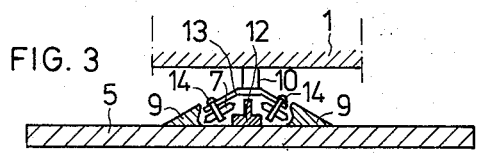
FIG. 3 is a schematic fragmentary sectional elevation taken along line III—III of FIG. 2 in the direction of the arrows and showing part of the vehicle body and structure connected thereto.

According to the embodiment of the invention which is illustrated in FIGS. 1–3, the lateral bracing of the endless track means 4 is provided by a guide means carried in part by the body 1 and in part by the endless track means 4 with this guide means of the invention cooperating only with a longitudinal central portion of the endless track means situated between the opposed sides thereof. In this example of the invention the part of the guide means which is carried by the body 1 includes a pair of guide rollers 7 carried by the body 1 at the region of each upright axis around which a frame means 3 turns when the vehicle executes a turn. As may be seen particularly from FIG. 3, each pair of guide rollers 7 is supported by a pair of shafts 14 which in turn are carried by a body 13 supported from the body 1 by way of a pin 10. Thus, it will be seen that each pair of guide rollers 7 is situated on opposite sides of a central longitudinal plane which includes the upright axes about which the frame means 3 turn. Moreover, as is apparent from FIG. 3, the turning axes of the rollers 7 diverge upwardly away from each other on opposite sides of the longitudinal central plane of the vehicle. As is apparent from FIG. 1 a pair of such guide rollers 7 are situated adjacent each of the upright axes about which a frame means 3 is capable of turning.

The guide means of the invention further includes guide elements 9 carried by the endless track means 4. In the example of FIGS. 2 and 3 the endless track means 4 includes a series of components 5 which are separate from each other and interconnected by way of the endless band 12, and each of these components 5 carries a pair of the guide elements 9. These elements 9 of each track component 5 are situated centrally of the latter while being spaced apart from each other so as to receive the guide rollers 7 therebetween in the manner shown in FIG. 3. Thus it will be seen that in each component 5 a pair of the guide elements 9 are situated equidistantly from and on opposite sides of the longitudinal central plane which includes the upright axes around which the pair of frame means 3 can turn. The pair of guide elements 9 carried by each component 5 at its inner surface are inclined upwardly toward each other and are formed at their ends which are nearest to each other with grooves for receiving the peripheries of the rollers 7 in the manner indicated in FIG. 3.

As is apparent from FIG. 1, each pair of guide rollers 7 is connected with the body 1 at the location of a transverse axis A—A. The pair of transverse axes A—A shown in FIG. 1 are situated closely adjacent to the pair of upright axes formed by the pivots 1a, and at this part of the body while the track means curves, the central longitudinal portion of the track means remains at the location of the upright axes defined by the pivots 1a. Thus the sets of guide rollers 7 are situated at the location where the central longitudinal portion of the track means will be located irrespective of the curvature of the track means.

Instead of providing separate lateral bracing elements 9, it is possible to use continuous bracing projections protruding from the inner surface of the endless track means 4 with such continuous bracing projections having the capability of stretching and contracting while also being shaped similarly to the elements 9 so as to cooperate with the rollers 7.

The elements 9 are indicated schematically in dot-dash lines in FIG. 1 where these dot-dash lines indicate how such continuous elements would extend along a continuous endless track means although the endless track means of FIg. 1 is intended to schematically illustrate an endless track means composed of separate components 5 interconnected by a band 12 as shown in FIG. 2. It will be seen from FIG. 1 that the front and rear rolls 2 are provided with tapered portions 2a in order to accommodate the elements 9.

Figure 4:
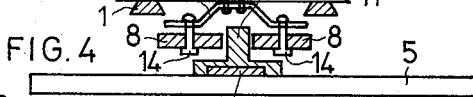
FIG. 4 is a schematic fragmentary transverse sectional elevation taken along line IV—IV of FIG. 1 in the direction of the arrows and also showing part of the vehicle body.

At a transverse center line B—B (FIG. 1) situated midway between the lines A—A along which the rolls 7 are located, or midway between the upright axes around which the pair of frame means 3 are capable of turning, there are a pair of additional guide rollers 8 forming part of the guide means for contributing to the lateral bracing achieved with the invention. These elements 8 are also turnable on shafts 14, as is apparent from FIG. 4, with these shafts 14 being carried by a suitable bracket 13 shaped similarly to the bracket 13 of FIG. 3 which carries a pair of rollers 7 through a pair of shafts 14 as described above. The bracket 13 of FIG. 4 is fixed to a central portion of an elongated slide bar 11 which is longitudinally shiftable along the axis B—B. The ends of the bar 11 are indicated in FIG. 1 where these ends are connected with ends of elongated rods 11a. Thus, each end of the slide bar 11 may carry a pin having above and below the bar 11 turnable portions each formed with a transverse bore in which a free end of a rod 11a is slidable. These rods 11a extend slidably through horizontal sleeves 11b which are pivoted to the body 1 by way of pivots 11c, and the ends of the rods 11a distant from the bar 11 are pivotally connected with the frame means 3, in the manner illustrated in FIG. 1. Thus, with this arrangement when one or both of the frame means 3 turn in one direction or the other, the linkage provided by way of the rods 11a, the sleeves 11b in which they slide, and the bar 11 acts on the rollers 8 to shift the latter laterally in the direction of the axis B—B in one direction or the other depending upon the direction of turning of the endless track means, and in this way the rollers 8 are properly shifted in accordance with the required curvature of the track means. The rollers 8 are shown in FIG. 1 shifted to a position 8a in accordance with the curvature of the endless track means 4 indicated in dot-dash lines in FIG. 1.

The elongated band 12 which interconnects the components 5 is fixed with a series of projections 16 which are of the substantially T-shaped configuration shown in FIG. 4. These projections 16 are respectively fixed with the components 5, and the lower horizontal portion of each projection 16 is formed with a groove to receive the band 12 in the manner shown in FIG. 4. Thus, with this arrangement the series of projections 16 will pass freely between the rollers 7 while being received between the rollers 8 in order to cooperate with the latter for providing lateral bracing in the manner shown in FIGS. 1 and 4. It will be noted that the front and rear rolls 2 are also formed with circumferential grooves for accommodating the projections 16. It is furthermore to be noted that these projections 16 when passing through the circumferential grooves situated centrally of each roller 2 cooperate with the latter for providing lateral bracing at the rollers 2.

The endless track means 4 is shown in dot-dash lines in FIG. 1 when it has been curved to an extent which may be considered the minimum turning radius R. The pairs of rollers 7 are situated substantially symmetrically with respect to the transverse center line B—B while being relatively close to the end rolls 2, as illustrated. When the vehicle is turned, the opposed sides of the endless track means 4 will bend so as to assume a curved configuration which is determined on the one hand by the guide rollers 7 which remain at the locations illustrated in FIG. 1 and on the other hand by the guide rollers 8 which are laterally shiftable as described above. As is apparent from the above description, the smaller the turning radius the greater the extent of lateral displacement of the guide rollers 8.

It is furthermore to be noted that, as contrasted with a construction where bracing guide rollers or the like were located at the center line B—B to engage the opposed side edges of the endless track means, with the structure of the invention the laterally shiftable guide rollers 8 which cooperate with guide means at the longitudinal central region of the endless track means provides a construction according to which the centroid, or center of mass, of the endless track means automatically shifts outwardly toward the outer side of the turn so that the surface on which the vehicle rests when executing a turn has the center of mass thereof always shifted toward the outer side of the turn. Thus, through this arrangement added stability is achieved for the vehicle when the latter executes a turn. In FIG. 1 the guide rollers 8 have been shown in the position 8a consistent with the minimum turning radius.

Figure 5:
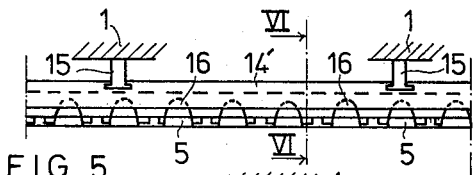
FIG. 5 is a schematic longitudinal sectional elevation of part of an endless track means with part of a vehicle body and the guide means of the invention connected in part to the vehicle body and in part to the endless track means.
Figure 6:
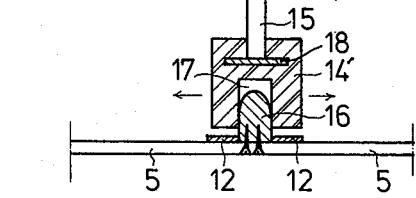
FIG. 6 is a transverse section of the structure of FIG. 5 taken along line VI—VI of FIG. 5 in the direction of the arrows and showing further details of the embodiment of FIG. 5.

According to the embodiment of the invention which is illustrated in FIGS. 5 and 6, on each side of the longitudinal center of the endless track means there is a band 12, so that these bands 12 which are connected either to an endless track which is continuous or to separate components 5 define between themselves a central space which receives a guide element 16 of the guide means of FIGS. 5 and 6 which serves to laterally brace the endless track means. Thus with this embodiment the series of elements 16 are fixed directly to the components 5, respectively, with the continuous bands 12 respectively being situated on opposite sides of the central projection 16 and also being fixed to the series of components 5 of the endless track means.

Furthermore, with the embodiment of FIGS. 5 and 6, instead of pairs of guide rollers, the part of the guide means which is fixed to the body 1 includes an elongated laterally flexible member 14' which forms a continuous guide rail extending between the pivots 1a and having ends relatively close to the pivots 1a at the locations of the rollers 7 shown in FIG. 1 where the transverse axes A—A are situated. The longitudinal central plane of the guide rail 14' coincides with the plane which contains the upright axes formed by the pivots 1a, when the track means is in the straight solid-line condition shown in FIG. 1. This elongated guide rail 14' is formed at its underside with a continuous groove 17 which receives the series of projections 16 the opposed sides of which slidably engage the opposed side surfaces of the groove 17, as is apparent from FIGS. 5 and 6. Instead of a single continuous slide rail 14' it is possible to use a series of consecutive components arranged in a row so as to form the equivalent of a continuous slide rail. This guide element 14' is made of an elastic material having a low coefficient of friction, and any suitable plastic may be used for this purpose. Thus, the slide rail 14' is capable of yielding laterally, and the lateral rigidity of the element 14 may be increased by providing a reinforcing insert 18 within the body of the element 14'. A plurality of pins 15 are fixed to the body 1 as well as to the guide element 14' in the manner shown in FIGS. 5 and 6, so that in this way the guide element 14' is supported from the body 1 at a proper elevation to cooperate slidably with the projections 16. The connection of the rail 14' to the pins 15 is such that the rail 14' is capable of swivelling around the pins 15, and a pair of such pins may be located at the transverse axes A—A shown in FIG. 1. Moreover, at its central region, situated midway between the axes A—A, the slide rail 14' may fixedly carry a pair of laterally extending projections connected through linkage components such as the rods 11a described above to the pair of frame means 3, so that with such a construction it is also possible to control the extent of curvature of the rail 14' in conformity with the curvature of the track means so as to achieve in this way lateral bracing not only in the regions of the pivots 1a but also at a region midway between the pivots 1a.

It is thus apparent from the above description that the guide means of the invention may take a number of different forms in order to achieve the desired lateral bracing of the endless track means. The details of the guide means are not of particular importance from the viewpoint of the present invention. What is important from the viewpoint of the present invention is that the lateral bracing of the endless track means and the smooth curvature thereof are brought about by way of a guide means which cooperates with the longitudinal central portion of the endless track means, this longitudinal central portion being situated midway between the opposed sides of the track means. Thus, the lateral bracing of the present invention is brought about by cooperation with the center line of the endless track means, considered in the direction of travel of the vehicle. Of course, it is possible to achieve certain advantages by combining the substantially unstretchable central band structure 12 of the endless track means with the guide means of the invention, at its part which is connected to the endless track means, in order to achieve the lateral bracing of the invention.

What is claimed is:

1. In a vehicle, a vehicle body, front and rear rolls, endless track means extending around said front and rear rolls, a pair of frame means connected with said body and said rolls for supporting said body thereon, at least one of said frame means being connected to said body for turning movement around a substantially upright axis, said one frame means also being connected with one of said rolls for turning with the latter while said one frame means turns around said upright axis when the vehicle executes a turn, said endless track means having opposed sides one of which becomes longer and the other of which becomes shorter when the vehicle executes a turn and said endless track means having a longitudinal central portion situated between said opposed sides thereof, and guide means carried in part by said body and in part by said longitudinal central portion of said endless track means for guiding and laterally bracing said endless track means during execution of a turn, a part of said guide means which is carried by said body being located closely adjacent to said upright axis, the latter upright axis having a fixed position with respect to the remainder of the vehicle and said part of said guide means which is closely adjacent to said upright axis being situated close enough thereto to remain substantially uninfluenced by said endless track means during execution of turns and said guide means being connected only between said body and said endless track means.

2. The combination of claim 1 and wherein said body also carries substantially midway between said rolls a laterally shiftable part of said guide means which cooperates with the longitudinal central portion of said endless track means.

3. The combination of claim 1 and wherein said guide means includes at its part which is carried by said body a pair of guide rollers respectively situated on opposite sides of a longitudinal central plane which includes said upright axis and the part of said guide means which is carried by said endless track means cooperating with said rollers.

4. The combination of claim 3 and wherein said guide rollers have on opposite sides of said plane inclined axes which diverge from each other in an upward direction, and said endless track means carrying guide members engaging said guide rollers and between which said guide rollers are received during movement of said endless track means around said front and rear rolls.

5. The combination of claim 4 and wherein said axes of said guide rollers are fixed.

6. The combination of claim 4 and wherein both of said frame means are connected to said body for turning movement about substantially upright axes, respectively, and said guide means including a pair of guide rollers carried by said body in the region of each of said upright axes with said guide members carried by said endless track means cooperating with both sets of guide rollers, and said guide means including a laterally shiftable pair of rollers carried by said body and situated substantially midway between said upright axes with said endless track means carrying projections received between said laterally shiftable rollers to be guided thereby.

7. In a vehicle, a vehicle body, front and rear rolls, endless track means extending around said front and rear rolls, a pair of frame means connected with said body and said rolls for supporting said body thereon, at least one of said frame means being connected to said body for turning movement around a substantially upright axis, said one frame means also being connected with one of said rolls for turning with the latter while said one frame means turns around said upright axis when the vehicle executes a turn, said endless track means having opposed sides one of which becomes longer and the other of which becomes shorter when the vehicle executes a turn and said endless track means having a longitudinal central portion situated between said opposed sides thereof, and guide means carried in part by said body and in part by said longitudinal central portion of said endless track means for guiding and laterally bracing said endless track means during execution of a turn, said guide means including at a part which is carried by said body an elongated guide member extending longitudinally of said body and formed with a downwardly directed groove, a part of said guide means which is carried by said endless track means including projections carried by an inner surface of said track means and received in said groove.

8. The combination of claim 7 and wherein said elongated guide member carried by said body is capable of curving laterally and is pivotally connected with said body at least in the region of said upright axis.

* * * * *